United States Patent

[11] 3,603,582

| [72] | Inventor | Ralph M. Nelson<br>South Bend, Ind. |
|---|---|---|
| [21] | Appl. No. | 837,523 |
| [22] | Filed | June 30, 1969 |
| [45] | Patented | Sept. 7, 1971 |
| [73] | Assignee | The Bendix Corporation |

[54] FLEXIBLE HOLDDOWN BAND FOR BRAKESHOE AND LINING-HOLDING FIXTURE
5 Claims, 6 Drawing Figs.

[52] U.S. Cl. ............................................. 269/321 B, 269/130, 269/254
[51] Int. Cl. .......................................................... B23q 3/00
[50] Field of Search............................................ 269/130, 131, 132, 254, 321 B; 100/93

[56] References Cited
UNITED STATES PATENTS
3,273,880  9/1966  Wesstrom...................... 269/254

*Primary Examiner*—Donald R. Schran
*Assistant Examiner*—Donald D. Evenson
*Attorneys*—Gordon H. Chenez and Plante, Arens, Hartz, Hix and Smith ABSTRACT: A flexible arcuate metal band having spaced-apart laterally extending flexible tab portions to which tapered locating pins are fixedly secured. The band is adapted to overlay a brakeshoe and associated brake lining with the tapered locating pins bearing against the edges of the shoe and lining to thereby accurately and positively fix the position of the lining relative to the shoe.

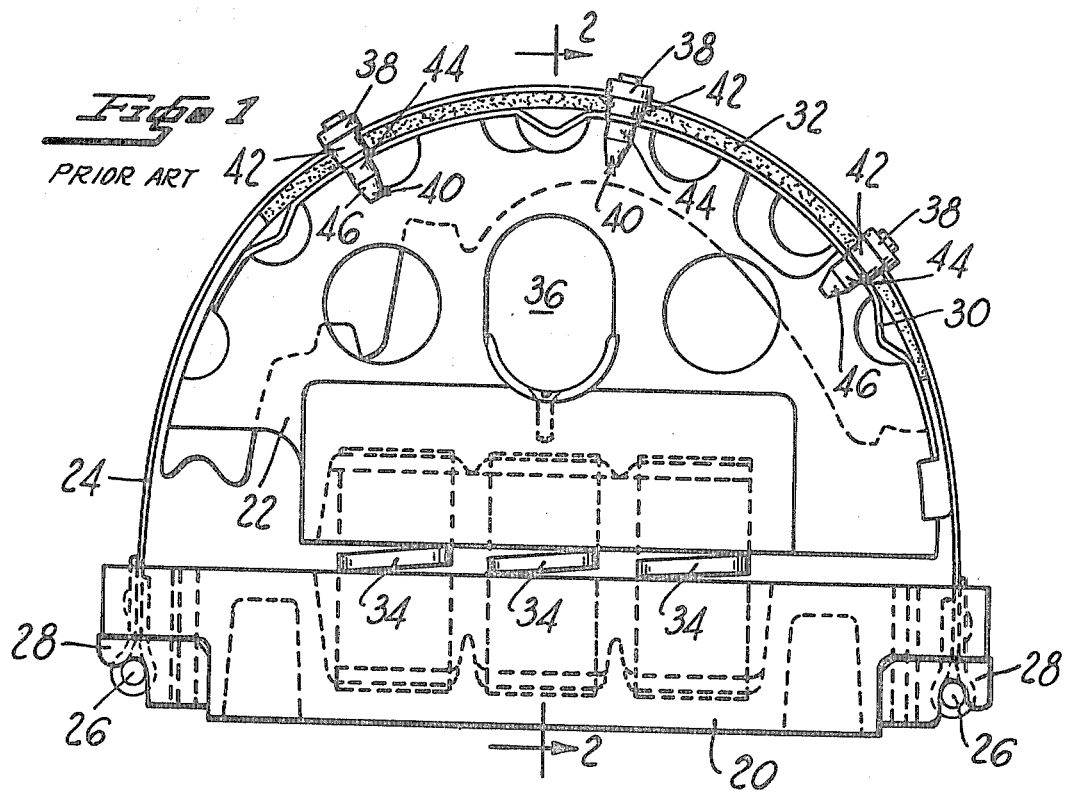
Fig. 1 PRIOR ART
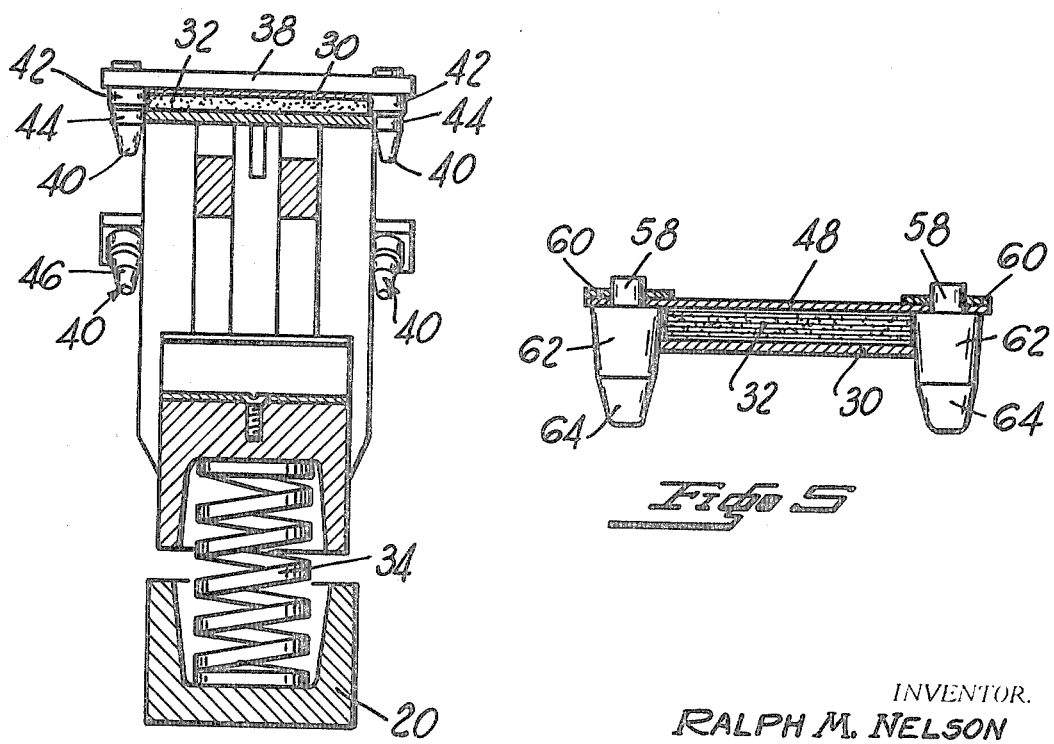
Fig. 2 PRIOR ART
Fig. 3
INVENTOR.
RALPH M. NELSON
BY
Gordon H. Chavez
AGENT

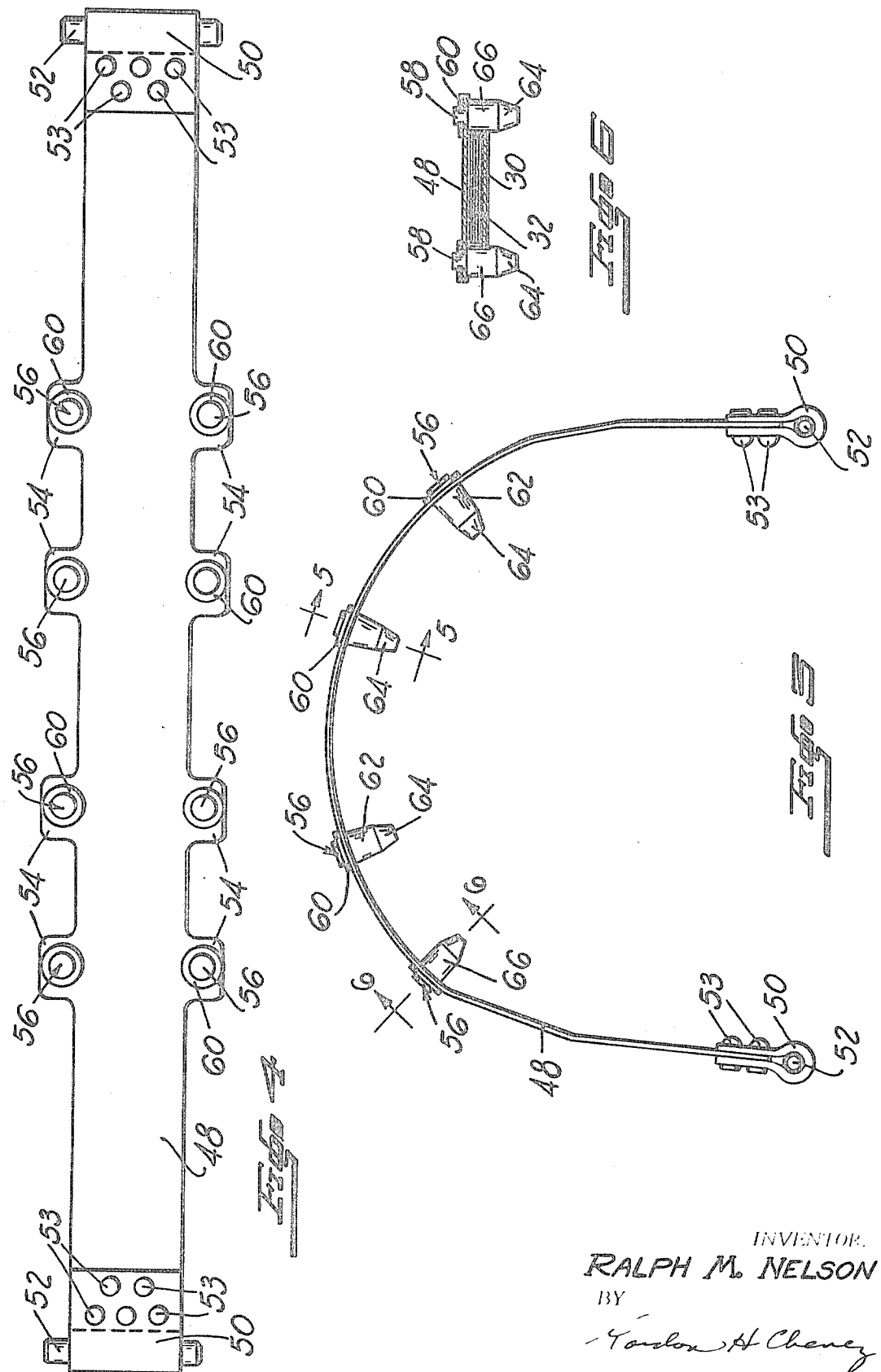

FLEXIBLE HOLDDOWN BAND FOR BRAKESHOE AND LINING-HOLDING FIXTURE

BACKGROUND OF THE INVENTION

1. Field of Invention

This invention relates to work holding fixtures and, in particular, to a brakeshoe and lining-holding fixture for holding a brakeshoe and lining in fixed relative positions to facilitate bonding together of the same.

2. Description of the Prior Art

The present invention constitutes a flexible holddown band which is an improvement of the flexible holddown band forming part of the brakeshoe and lining-holding fixture disclosed and claimed in U.S. Pat. No. 3,273,880 issued Sept. 20, 1966, to A. Wesstrom et al., and entitled "Brake Shoe and Lining Holding Fxiture." The present application and U.S. Pat. No. 3,273,880 have a common assignee.

SUMMARY OF THE INVENTION

It is an object of the present invention to provide a flexible holddown band for a brakeshoe and lining-holding fixture wherein the band is provided with spaced-apart locating members fixedly secured thereto and engageable with a brakeshoe and associated lining for fixing the relative positions thereof and the band is adapted to flex transversely in response to spreading of said spaced-apart members as a result of oversize width of the brake lining and/or brakeshoe.

It is another object of the present invention to provide a flexible holddown band for a brakeshoe and lining-holding fixture wherein the band is provided with spaced-apart members fixedly secured thereto and engageable with a brakeshoe and associated lining for fixing the relative positions thereof regardless of relative width variations thereof within a predetermined range of manufacturing tolerances.

It is an important object of the present invention to provide a flexible holddown band for a brakeshoe and lining-holding fixture which is simple and rugged in construction, economical to make and capable of repeated use under adverse conditions.

BRIEF DESCRIPTION OF THE DRAWINGS

FIG. 1 represents a schematic view of a prior art brakeshoe and lining-holding fixture including a flexible holddown band shown and described in U.S. Pat. No. 3,273,880;

FIG. 2 is a view taken on line 2—2 of FIG. 1;

FIG. 3 represents a side view of a flexible holddown band embodying the present invention which is adapted to replace the prior art flexible holddown band of FIG. 1;

FIG. 4 is a plan view of the flexible holddown band of FIG. 3;

FIG. 5 is a view taken on line 5—5 of FIG. 3;

FIG. 6 is a view taken on line 6—6 of FIG. 3.

DESCRIPTION OF THE PREFERRED EMBODIMENT

Referring to FIG. 1 and 2 and the prior art brakeshoe and lining-holding fixture shown therein, it will be understood that the same is adapted preferably for a conventional bonding operation wherein the fixture is passed through a conventional bonding oven and subjected to hot-motive air to thereby bond the lining 32 to the brakeshoe 30.

The fixture includes a base member 20 and an upper support member 22. Flexible metal holddown band 24 is provided with rods 26 secured to opposite ends thereof which rods 26 engage associated anchor members 28 fixedly secured to opposite ends of base member 20. A brakeshoe 30 and associated brake lining 32 suitably positioned on support member 22 is trapped between holddown band 24 and support member 22 under the influence of a plurality of compression springs 34 interposed between base member 20 and support member 22 and urging the same apart. An opening 36 in support member 22 is adapted to receive a bar or the like, not shown, which, with base member suitably supported against movement thereof, may be engaged with support member 22 to urge the same toward base member 20 to compress springs 34 thereby unloading holddown band 24 to permit uncoupling rods 26 from anchor members 28 for assembly or disassembly purposes.

The holddown band 24 is provided with a plurality of spaced-apart bars 38 each of which is fixedly secured to band 24 by any suitable means such as rivets or the like, not shown, and each of which carry a pair of spaced-apart locating members 40 fixedly secured thereto. The locating pins are each provided with a larger diameter portion 42, a smaller diameter portion 44 and a tapered end portion 46. Each pair of locating members 40 are spaced such that the brake lining 32 fits between the larger diameter portions 42 and the rim of brakeshoe 30 fits between the smaller diameter portions 44 thereby establishing positive alignment of the lining 32 and shoe 30.

Referring to FIG. 3, 4, and 5, there is disclosed a flexible holddown band or pressure member 48 embodying the present invention which is superior in construction and operation relative to the prior art holddown band 24 and which may be readily substituted therefor without modifying the remaining portion of the brakeshoe and line-holding fixture.

The holddown band 48 is preferably in the form of a flat strap or band of flexible sheet metal having opposite end portions each of which is provided with a fastening member 50 looped around a rod 52 and fixedly secured to band 48 by any suitable means such as a plurality of rivets 53. The band 48 is further provided with a plurality of spaced-apart laterally extending projections or tabs 54 on each side thereof which are arranged in laterally aligned pairs as shown in FIG. 4.

Each projection or tab 54 has a locating member or pin 56 fixedly secured thereto which is preferably circular but which may take other suitable form and has a stem 58 which extends through a suitable opening, not shown, in tab 54 and a washer 60. The end of stem 58 is peened over to fixedly secure locating member 56 in position on tab 54. Counting from the right-hand end of band 48 as viewed in FIG. 4, the first three pairs of tabs 54 are provided with locating members or pins 56 having tapered portions 62 and 64, whereas the remaining pair of tabs 54 is provided with locating members 56 having a straight or constant diameter portion 66, which terminates in tapered-end portion 64 for a purpose to be described hereinafter.

Assuming the improved band 48 to be substituted for the prior art band 24 in FIG. 1, the band 48 will engage the rim of brakeshoe 30 and associated lining 32 as shown in FIGS. 5 and 6. The angle of tapered portion 62 is determined by the expected width of the brake lining 32 relative to the width of the rim of brakeshoe 30.

The nominal width of the rim of brakeshoe 30 to be used determines the spacing required between a pair of locating members or pins 56. As shown in FIG. 5, the rim edges of the brakeshoe 30 contact the adjacent tapered surfaces 62 of locating members 56 approximately at the midpoint thereof when the brakeshoe 30 with associated lining 32 is loaded in position against support member by springs 34. The spacing between locating members 56 at the largest diameter portion thereof is substantially equal to the width of lining 32 such that the lining 32 is positioned laterally relative to shoe 30, thereby establishing substantially equal lateral clearance between the arcuate edges of the rim of shoe 30 and adjacent edges of lining 32. It is important that the lining 32 be properly positioned in the above-mentioned manner to avoid the lining 32 overhanging the rim of shoe 30 which necessitates side sanding of the lining 32 to eliminate the overhang. Side sanding is undesirable, not only from the standpoint of time and labor required to carry out the sanding operation and possible reject of the shoe 30 and lining 32, but due to resulting obliteration of identifying marks on the arcuate edge or edges of lining 32 which, in the event of mandatory requirement for such marks, necessitates replacing the marks by manual stamping if the shoe 30 and lining 32 are to be salvaged. Again the time and labor expenditure for remarking the lining 32 constitutes an undesirable expense.

The the event of tolerance variations in the width of the rim of brakeshoe 30 and/or lining 32, the arcuate edges of the brakeshoe or lining may contact the tapered surfaces 62 of locating members 56 before lining 32 is seated against band 48, thereby tending to spread the locating members 56 apart. The spreading of locating members 56 is compensated for by the tabs 54 which flex relative to the arcuate portion of band 24, thereby permitting band 24, thereby permitting band 48 to engage lining 32 over the arcuate length of lining 32. It has been found that the band 48 can withstand repeated flexing in the above-mentioned manner to compensate for oversize width of shoe 30 and/or lining 32 with little or no adverse effect on the band 48.

The pair of locating members 56 having straight portions 66 are provided to permit use of the band 48 with lining 32 of various arcuate lengths as in the case of conventional primary and secondary brakeshoes. Assuming a lining 32 arcuate length equivalent to or greater than the band 48 length from one end pair to the other end pair of locating members 56, it will be understood that band 48, under tension by virtue of springs 34, will be equally spaced from the rim of brakeshoe 30 over the portion of band 48 abutting lining 32. However, in the event of a short lining 32 which, for example, may end short of the pair of locating members 56 having straight portions 66, the portion of band 48 to which said locating members 56 are attached will be drawn relatively close to the rim of shoe 30. If the locating members 56 were provided with tapered surfaces 62 rather than straight portions 66, undue interference between the locating members 56 and rim of brakeshoe 30 would result, causing excessive spreading of locating member 56. By providing straight portions 66 on locating members 56 the members 56 can slip over the rim of shoe 30 without the above-mentioned undue interference when band 48 is drawn close to the rim of shoe 30.

The locating members 56 having straight portions 66 do not function to locate lining 32 relative to shoe 30 but do locate band 48 transversely relative to shoe 30. However, it will be understood that the lining 32 is accurately positioned over its entire arcuate length by the remaining locating members 56.

The band 48 has additional advantages over prior art band 24 in that it is less expensive to make and provides for better distribution of heat around the band 48 in the bonding oven since no obstructions, such as bars 38 of band 24, are present to disrupt airflow.

What I claim is:

1. A holddown member for a brakeshoe and lining-holding fixture having a base member, an upper member adapted to support a brakeshoe and associated lining, and resilient means for urging the base member and upper member apart, said holddown member comprising:
   a pressure member adapted to overlay the brakeshoe and associated lining and provided with end portions secured to the base member;
   a plurality of spaced-apart tab portions flexible with respect to the rest of said pressure member in spaced-apart relationship; and 2. A holddown member as claimed in claim 1 wherein:
   said locating means is defined by a member having a tapered surface which bears against the lateral edges of the brakeshoe and lining to maintain the brake shoe and lining in fixed relative lateral positions.

3. A holddown member as claimed in claim 1 wherein:
   each of said tab portions is defined by a flexible metal tab integral with and extending laterally from said pressure member;
   said locating means is fixedly secured to said tab.

4. A holddown member as claimed in claim 1 wherein:
   said pressure member is a flexible sheet-metal strap provided with a laterally extending tab portion defining each of said support members;
   said tab portions are arranged in spaced-apart relationship on opposite sides of said strap in oppositely extending laterally aligned relationship.

5. A holddown member as claimed in claim 3 wherein:
   said locating means is a tapered-circular member fixedly secured at its larger diameter end to said tab portion.

PO-1050
(5/69)

UNITED STATES PATENT OFFICE
CERTIFICATE OF CORRECTION

Patent No. 3,603,582          Dated September 7, 1971

Inventor(s) Ralph M. Nelson

It is certified that error appears in the above-identified patent and that said Letters Patent are hereby corrected as shown below:

In the claims, Column 4, after line 19, add the following paragraphs:

--locating means secured to each of said tab portions in fixed spaced-apart relationship and engageable with the brake shoe and associated lining for holding the same in fixed relative positions;

said tab portions flexing in response to said locating means being urged apart in response to an oversize condition of the brake shoe and associated lining relative to the spacing defined by the fixed spaced-apart relationship of said locating means.---.

Signed and sealed this 18th day of January 1972.

(SEAL)
Attest:

EDWARD M. FLETCHER, JR.      ROBERT GOTTSCHALK
Attesting Officer              Acting Commissioner of Patents